United States Patent [19]

Frushour et al.

[11] Patent Number: 4,644,237
[45] Date of Patent: Feb. 17, 1987

[54] COLLISION AVOIDANCE SYSTEM

[75] Inventors: James E. Frushour, Endwell; Michael L. Mahar, Newark Valley; Christopher J. Majka, Endicott; John E. Swenson, Greene, all of N.Y.

[73] Assignee: International Business Machines Corp., Armonk, N.Y.

[21] Appl. No.: 788,262

[22] Filed: Oct. 17, 1985

[51] Int. Cl.[4] .............................................. G05D 1/02
[52] U.S. Cl. ..................... 318/313; 318/587; 318/640; 367/909
[58] Field of Search ............... 318/313, 480, 640, 587; 367/909

[56] References Cited

U.S. PATENT DOCUMENTS

| | | | |
|---|---|---|---|
| 3,442,347 | 5/1969 | Hodgson et al. | 367/909 |
| 3,892,483 | 7/1975 | Saufferer | 367/909 X |
| 4,026,654 | 5/1972 | Beaurain | 367/909 X |
| 4,473,787 | 9/1984 | Schick | 318/587 |
| 4,554,498 | 11/1985 | Fujiwara et al. | 318/640 |

Primary Examiner—Benjamin Dobeck
Attorney, Agent, or Firm—Milton M. Field

[57] ABSTRACT

A collision avoidance system for a two arm robot is direction sensitive. When the separation between the arms is sensed as equal to or smaller than a predetermined distance, the trailing arm is slowed to avoid a collision. The separation sensor generates a first "slow" signal when the separation is a first predetermined distance, a second "slow" signal when the separation is a second predetermined distance, smaller than the first, and a "stop" signal when the separation is a third predetermined distance, smaller than the second. The polarity of the drive signals for the arms determine their direction, and polarity sensitive comparators determine the direction of each arm. When the first "slow" signal is present and one arm is moving in the direction of the other arm, a speed reducing resistor is inserted in the circuit for the drive signal for the one arm to reduce its speed. When the second "slow" signal is also present, a second speed reducing resistor is inserted in the drive signal circuit for the one arm, further reducing the velocity. A "stop" signal causes a controller to stop both arms.

13 Claims, 7 Drawing Figures

COLLISION AVOIDANCE SYSTEM

FIELD OF THE INVENTION

This invention relates to robot control systems and, more particularly, to a collision avoidance system for two arm robots.

BACKGROUND OF THE INVENTION

Two arm robots or x, y, z positioning systems are increasingly used in test equipment for moving test probes to test positions across circuit boards. In such systems, when the arms are driven at different speeds along a common path, there is the danger that the arms, or the test probes attached to the arms, may collide resulting in significant damage.

This problem is avoided in equipment manufactured by Anorad Corporation in which both arms are slowed down without regard to the direction of movement whenever the arms are within a certain distance of each other. This results in much greater move times for long moves whenever the spacing between the arms stays small during the move. It has also been suggested that, in cases which could result in collisions, the arms be moved one after the other; but this also increases move times.

Another collision avoidance system is shown in U.S. Pat. No. 3,053,948 which proposes the use of detector wires forming a protective detector envelope or cage to actuate a switch upon engagement with an obstruction to stop all drive motions. U.S. Pat. No. 3,967,242 uses a visual sensor to cause retraction of the working unit whenever an obstacle is detected. The system shown in U.S. Pat. No. 4,332,989 operates after the fact: a collision responsive switch causes shutdown or retraction of the moved parts. All of these systems thus cause a disruption of operation in response to an incipient or actual collision.

SUMMARY OF THE INVENTION

It is the object of the present invention to provide an improved collision avoidance system which overcomes the aforementioned drawbacks of the prior art systems.

A related object is the provision of such a system which, in most cases, permits continued operation of a two arm robot without unduly lengthening move times.

A further object is the provision of a system of this character which is direction sensitive so that only the trailing arm is slowed when the spacing between the arms becomes too small.

In accordance with the present invention, whenever the separation between the arms travelling along a common path is equal to or less than a predetermined distance, as detected by sensing means, the velocity of the trailing arm is decreased. This prevents the trailing arm from overtaking, and colliding with, the leading arm. This is accomplished while maintaining, for the most part, normal move rates for the arms. Only when the separation between the arms falls to or below the predetermined distance is the speed of the trailing arm reduced, and the speed of the leading arm is usually not affected at all. As a result, move times are often as low as one-tenth of those attained with the aforementioned Anorad Corporation equipment.

The sensing means generates a first "slow" signal when the distance between the moving arms, or objects, is equal to or less than the predetermined distance, a second "slow" signal when the distance between the moving arms is equal to or less than a second predetermined distance, smaller than the first predetermined distance, and a "stop" signal when the distance between the first and the second arms is equal to or less than a third predetermined distance, smaller than the second predetermined distance. In order to generate these signals, the sensing means includes photosensor means mounted for movement with one of the arms and a mask member mounted for movement with the other arm, the mask member being configured with two steps so that it has three portions of different length extending towards the one arm substantially parallel to the path. The photosensor means includes three lamp-photosensor pairs each cooperating with one of the portions of the mask so that the longest portion of the mask, when it interrupts the light transmission in the first lamp-photosensor pair, causes its photosensor to generate the first "slow" signal, so that the second longest portion of the mask, when it interrupts the light transmission in the second lamp-photosensor pair, causes its photosensor to generate the second "slow" signal, and so that the shortest portion of the mask, when it interrupts the light transmission in the third lamp-photosensor pair causes its photosensor to generate the "stop" signal.

A controller generates a first drive signal for energizing first drive means during the first arm and a second drive signal for energizing second drive means for driving the second arm, the polarity of the drive currents determining the direction of movement of the arms. Control means, which is responsive to the "slow" signals for reducing the speed of movement of the arms, comprises logic circuit means for generating control signals and four speed reducing means responsive to the control signals for reducing the speed of the arms. The logic circuit means generates a first control signal when the first arm is being driven toward the second arm and the first "slow" signal is present, a second control signal when the second arm is being driven toward the first arm and the first "slow" signal is present, a third control signal when the first arm is being driven toward the second arm and the second "slow" signal is present, and a fourth control signal when the second arm is being driven toward the first arm and the second "slow" signal is present.

The first speed reducing means comprises a first resistor in series between the controller and the first drive means and first switch means in parallel with the first resistor. The first switch means is responsive to the first control signal to be closed when said first control signal is absent and to be open when said first control signal is present. Similarly, the second speed reducing means comprises a second resistor in series between the controller and the second drive means and second switch means in parallel with the second resistor. The second switch means is controlled by the second signal to be closed when the second control signal is absent and open when the second control signal is present. The third speed reducing means includes a third resistor in series with first resistor between the controller and the first drive means and third switch means in parallel with the third resistor. The third switch means is controlled by the third control signal to be closed when the third control signal is absent and to be open when the third control signal is present. Likewise, the fourth speed reducing means comprises a fourth resistor in series with the second resistor between the controller and the second drive means and fourth switch means in parallel with the fourth resistor. The fourth switch means is responsive to the fourth control signal to be closed when the fourth control signal is absent and to be open when the fourth control signal is present. The "stop" signal is coupled from the sensing means to the controller to cause the controller to discontinue the drive signals being fed to the first and second drive means.

Thus, when the spacing of the trailing arm from the leading arm becomes equal to or less than the first predetermined distance, the first resistor is inserted between the controller and the drive means for the trailing arm, causing the trailing arm to slow down. If the trailing arm reaches a point where it is spaced no more than the second predetermined distance from the leading arm, the second resistor is inserted between the controller and the drive means for the trailing arm, causing a further slowdown of the trailing arm. These slowdowns make it unlikely that the trailing arm will overcome and collide with the leading arm. If, however, despite the slowdowns of the trailing arm, the arms become spaced no more than the third predetermined distance, the "stop" signal will cause both drive means to stop their respective arms thus avoiding a collision. In most cases, the first and second slowdowns will be sufficient to prevent a collision between the arms and the probes carried thereby. Since there would be no interruption of movement of the arms, collisions are avoided while minimizing any increase of move times.

BRIEF DESCRIPTION OF THE DRAWINGS

These and other objects, features and advantages of the invention will be more fully appreciated with reference to the accompanying drawings, in which.

DETAILED DESCRIPTION OF THE PREFERRED EMBODIMENT

Figure 1:
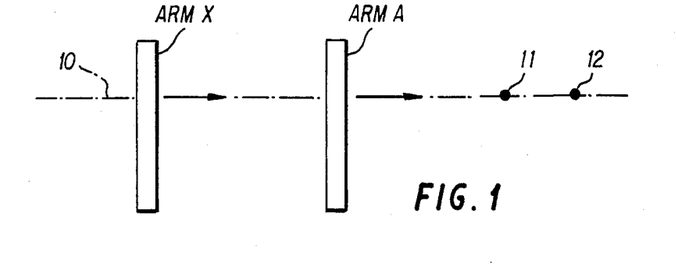
FIG. 1 is a diagram illustrating the environment of the invention.

FIG. 1 shows two arms A and X of a two arm robot being driven in a common direction along a common path 10. Arm A is being driven to point 12, while arm X is being driven to point 11. In this situation, a collision between arms A and X, or between probes or other equipment carried by the arms, is possible if the speed of arm X, the trailing arm, is greater than the speed of arm A, the leading arm. According to the invention, a collision is avoided by decreasing the speed of trailing arm X as the distance between the arms becomes equal to or smaller than a predetermined distance.

Figure 2:
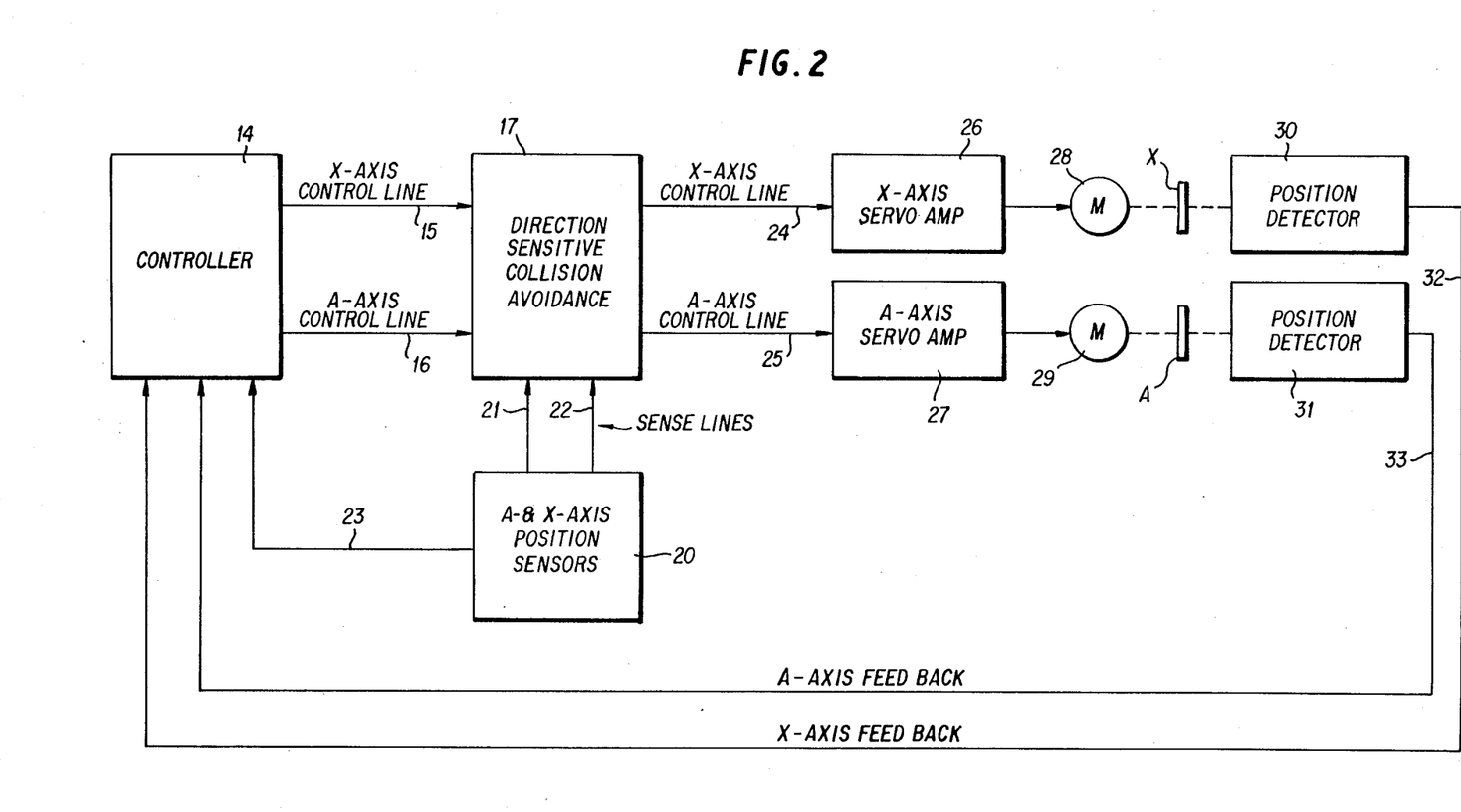
FIG. 2 is a block diagram showing the system of the invention.

The collision avoidance system of the invention is shown in FIG. 2. A conventional controller 14, such as an Ormec Model 901 controller, generates a drive signal for arm X on X-axis control line 15 and a drive signal for arm A on A-axis control line 16. These arms feed the drive signals as inputs to a direction sensitive collision avoidance circuit 17 which will be described more fully below with reference to FIGS. 5A and 5B. A- and X-axis position sensors 20 develop a pair of slowdown or "slow" signals on lines 21 and 22 whenever the distance between the arms becomes equal to or less than a first distance, such as three inches, and a second, smaller, distance, such as one inch. A "stop" signal is also generated by position sensors 20 when the distance between the arms falls to an even smaller separation, such as ¼ inch. This "stop" signal is coupled on line 23 to controller 14 to cause the controller to discontinue the drive signals on lines 15 and 16 and thus cause the arms to stop.

As will be explained more fully below, direction sensitive collision avoidance circuit 17 includes speed reducing means which, in response to "slow" signals on lines 21 and 22, reduce the magnitude of the drive signals fed, respectively, on X-axis control line 24 to X-axis servo amplifier 26 and on A-axis control line 25 to A-axis servo amplifier 27. Drive current from X-axis servo amplifier 26 is fed to servo drive motor 28 which drives arm X, and drive current from A-axis servo amplifier 27 is fed to drive motor 29 which drives arm A.

As is known in the art, position detectors 30 and 31 develop X-axis and A-axis feedback signals on leads 32 and 33 which are fed back to controller 14. The position detectors may, for example, be in the form of glass scales which cooperate with lamp-photoreceiver pairs. Alternatively, stepping motors could be used as motors 28 and 29, in which case the feedback signals would not be necessary.

Figure 3:
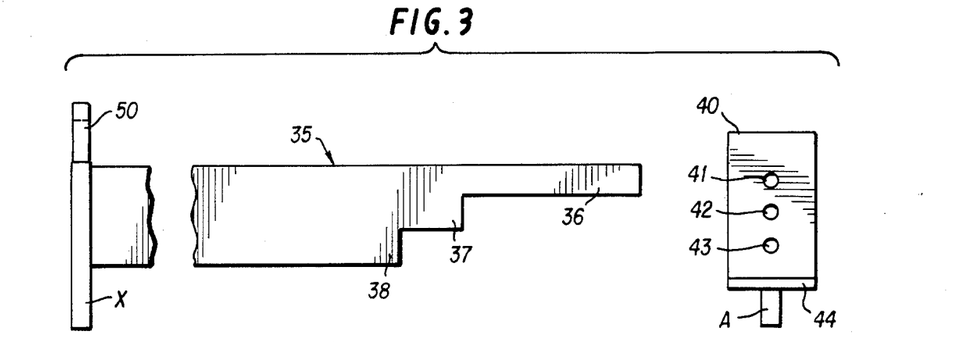
FIG. 3 is a schematic side elevation view, partially broken away, of the sensing means of the system of the invention.
Figure 4:
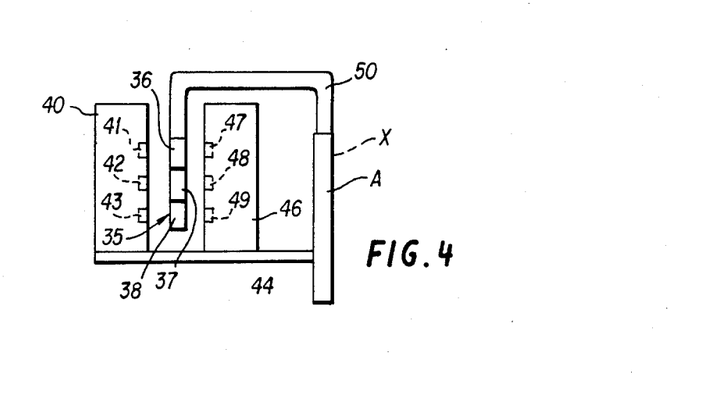
FIG. 4 is a schematic end view of the sensing means as seen from the right side of FIG. 3.

Position sensors 20 are embodied in the structure shown in FIGS. 3 and 4. A mask member 35, which may, for example, be mounted on arm X, extends toward arm A and is positioned substantially parallel to path 10. Mask member 35 includes two steps or cutouts creating three portions of different length. Portion 36, extending the full length of mask member 35, establishes a first predetermined separation distance. A first step defines a second portion 37 which establishes a second predetermined separation distance, and a second step forms a third portion 38 defining a third predetermined separation distance. A sensor mounting board or housing 40 supports three photosensors 41, 42 and 43 which are respectively aligned with mask portions 36, 37, and 38. As seen more clearly in the schematic diagram of FIG. 4, arm A supports a bracket 44 on which are mounted photosensor housing 40 and, spaced from housing 40, a lamp mounting board or housing 46, on which are mounted lamps 47, 48 and 49, respectively aligned with photosensors 41, 42 and 43. A bracket 50, which is mounted on arm X (see FIG. 3), supports mask member 35 which moves in a plane extending between housings 40 and 46. When the separation distance between arms A and X is equal to or less than the first predetermined distance, mask portion 36 extends between lamp 47 and photosensor 41 blocking the light from lamp 47. As a result, photosensor 41 generates the first "slow" signal. Likewise, when mask portion 37 is blocking the light between lamp 48 and photosensor 42, the arms are separated by a distance equal to or less than the second predetermined distance; this results in the generation of the second "slow" signal by photosensor 42. Finally, when mask portion 38 blocks the light from lamp 49 from reaching limit photosensor 43, the arms are separated by a distance equal to or less than the third predetermined distance. Photosensor 43 then generates the "stop" signal. Although the position sensors are shown as using lamps and photosensors on separate mounting boards or housings, it will be understood that the lamps and photosensors could be placed on a common mounting board or housing. In that case, the sensors would operate on a reflecting rather than a blocking principle.

Figure 5A:
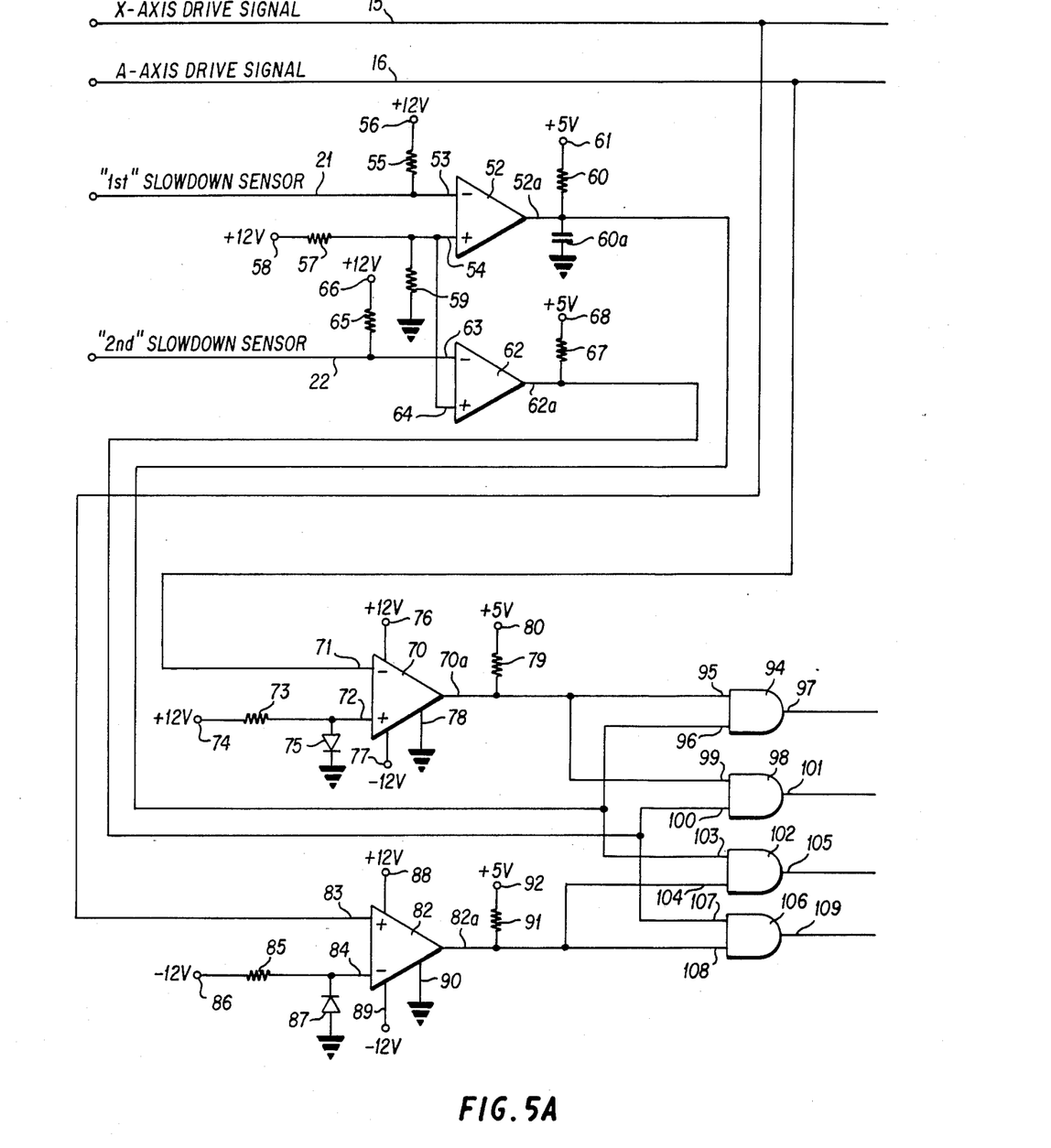
FIGS. 5A and 5B constitute a schematic circuit diagram of the direction sensitive collision avoidance circuit of the system of FIG. 2.
Figure 5B:
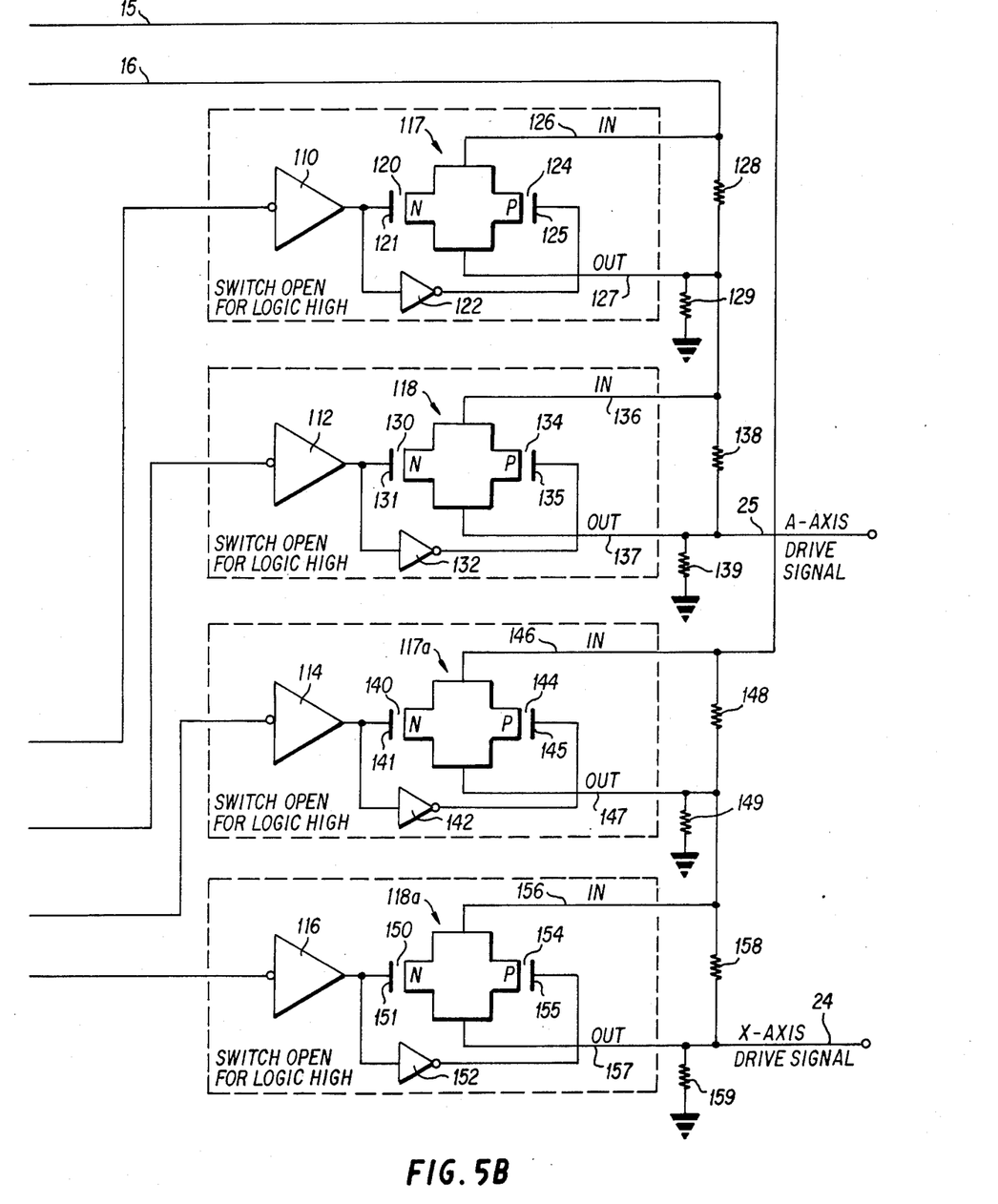

Turning to FIGS. 5A and 5B, it will be seen that direction sensitive collision avoidance circuit 17 receives the X-axis and A-axis drive signals on lines 15 and 16 and the first and second "slow" signals on lines 21 and 22. The first "slow" signal on line 21 is applied to a comparator 52 by connection to its − input terminal 53. The + input terminal 54 is connected through a 1,000 ohm resistor 57 to a +12 volt reference source 58 and through a 1,000 ohm resistor 59 to ground. The − terminal 53 is also connected through a 12,000 ohm resistor 55 to a +12 volt source 56. The output line 52a from comparator 52 is connected through a 1,000 ohm resistor 60 to a +5 volt source 61. When the first "slow" signal is absent from lead 21, the voltage at input 53 will be greater than that of the reference voltage on input 54; and the output on lead 52a will be low. When, on the other hand, the first "slow" signal is present on lead 21, the voltage on input 53 will not be greater than the reference voltage on input 54; and the output on lead 52a will be high. A 150 microfarad capacitor 60a is connected between line 52a and ground. This introduces a time delay to keep line 52a high for a short time when the "slow" signal is removed from input 53, preventing oscillations.

The second "slow" signal on lead 22 is applied to the − input 63 of comparator 62. Input 63 is also connected through a 12,000 ohm resistor 65 to a +12 volt source 66. The + input 64 of comparator 62 is connected to + input 54 of comparator 52 and, hence, to the +12 volt reference 58 through resistor 57 and to ground through resistor 59. The output from comparator 62 appears on output line 62a which is connected through a 1,000 ohm resistor 67 to a +5 volt source 68. If the second "slow" signal is absent from lead 22, the output on lead 62a will be low. If, on the other hand, the second "slow" signal is present on lead 22, output lead 62a will be high.

The A-axis drive signal on lead 16 is applied to the − input 71 of a comparator 70, the + input 72 of which is connected through a 1,000 ohm resistor 73 to a +12 volt reference voltage source 74 and through diode 75 to ground. A +12 volt source 76 and a −12 volt source 77 are also provided directly to bias terminals of comparator 70, and another terminal 78 is grounded. The output line 70a from comparator 70 is connected through a 1,000 ohm resistor 79 to a +5 volt source 80. When the A-axis drive signal on lead 15 is negative, the output from comparator 70 will be high. A positive A-axis drive signal will result in a low output on lead 70a.

The X-axis drive signal on lead 15 is applied to + input 83 of comparator 82, the − input 84 of which is grounded through diode 87 and connected through a 1,000 ohm resistor 85 to a −12 volt reference voltage source 86. Bias voltages of +12 volts and −12 volts are applied from sources 88 and 89 to comparator 82 which is grounded through terminal 90. The output lead 82a is connected through a 1,000 ohm resistor 91 to a +5 volt source 92. When the X-axis drive signal is positive, the output on lead 82a will be high. A negative X-axis drive signal will produce a low output on lead 82a.

A logic circuit including four AND gates 94, 98, 102 and 106 receives the outputs on leads 52a, 62a, 70a and 82a. AND gate 94 receives the output from lead 70a on input 95 and the output from lead 52a on lead 96. The presence of high signals on inputs 95 and 96 will produce a high signal on output lead 97; otherwise, the output will be low. AND gate 98 receives the output from lead 70a on input 99 and from lead 62a on input 100. If high signals are present on both inputs, the output on lead 101 is high. If this is not the case, a low output is found on lead 101. AND gate 102 has an input 103 connected to lead 52a and an input 104 connected to lead 82a. When high signals are on both inputs, a high output appears on lead 105. For other signal combinations on the inputs 103 and 104, the output on lead 105 is low. AND gate 106 has an input 107 connected to lead 62a and an input 108 connected to lead 82a. The presence of high signals on leads 107 and 108 will produce a high signal on output 109. Any other signal combination on inputs 107 and 108 will provide a low output on output 109.

The system includes speed reducing means, two for arm A and two for arm X, comprising resistors inserted in series between the controller and the servo amplifiers. These resistors are normally shorted by switch means controlled by the logic circuit. Thus, line 16 for the A-axis drive signal is in series with a 1,000 ohm resistor 128, a 6,800 ohm resistor 138 and A-axis drive signal line 25. Shunt resistors 129 and 139, each having a 1,000 ohm value, are connected, respectively, to ground from the junction between resistors 128 and 138 and from line 25. Lines 15 and 24 for the X-axis drive signal are likewise linked by series connected speed reducing resistors 148 and 158, having values of 1,000 ohms and 6,800 ohms, respectively. Again, shunt 1,000 ohm resistors 149 and 159 are connected to ground from the junction point between resistors 148 and 158 and from line 24.

Resistor 128 is normally shunted by switch means 117 which is a conventional CMOS switch comprising an N-channel FET 120 and a P-channel FET 124, both shunted across resistor 128. FETs 120 and 124 are triggered by a control switch circuit 110 which is connected directly to the gate electrode 121 of FET 120 and through inverter 122 to the gate electrode 125 of FET 124. When the input to control switch 110 is a logic low, the switch is closed applying a high input to gate electrode 121 of FET 120 and a low input, by virtue of inverter 122, to gate electrode 125 of FET 124, causing the FETs to be conductive and short circuiting resistor 128. When, on the other hand, the input to control switch 110 is a logic high, the switch is open applying a low input to gate electrode 121 of FET 120 and a high input, due to inverter 122, to gate electrode 125 of FET 124. The FETs will therefore become nonconductive, removing the short circuit from resistor 128. This will insert the resistor in the series circuit between A-axis drive signal lines 16 and 25. Similarly, CMOS switch means 118, comprising N-channel FET 130 and P-channel FET 134, is actuated by control switch circuit 112, when line 101 is low, by virtue of the direct connection to gate electrode 131 of FET 130 and the connection through inverter 132 to gate electrode 135 of FET 134, to maintain a short circuit across resistor 138. When line 101 from AND gate 98 is high, control switch 112 will deactivate switch means 118. FETs 130 and 134 will no longer be conductive, removing the short circuit and inserting resistor 138 in the series circuit. CMOS switch means 117a and 118a likewise short circuit resistors 148 and 158, respectively, when actuated. Switch means 117a, which comprises N-channel FET 140 and P-channel FET 144 connected across resistor 148 with switch 114 directly connected to gate electrode 141 of FET 140 and through inverter 142 to gate electrode 145 of FET 144, is triggered by control switch circuit 114 when line 105 from AND gate 102 is low and deactivated when line 105 is high. Switch means 117a thus short circuits resistor 148 when 105 is low, but inserts the resistor in the series circuit when 105 is high. Switch means 118a operates in the same way with reference to whether line 109 from AND gate 106 is high or low and comprises N-channel FET 150 and P-channel FET 154 connected across resistor 158. The FETs are actuated by control switch circuit 116, which is connected directly to gate electrode 151 of FET 150 and through inverter 152 to gate electrode 155 of FET 154, to short circuit resistor 158 when 109 is low and to insert resistor 158 in the series circuit when 109 is high.

Figure 6:
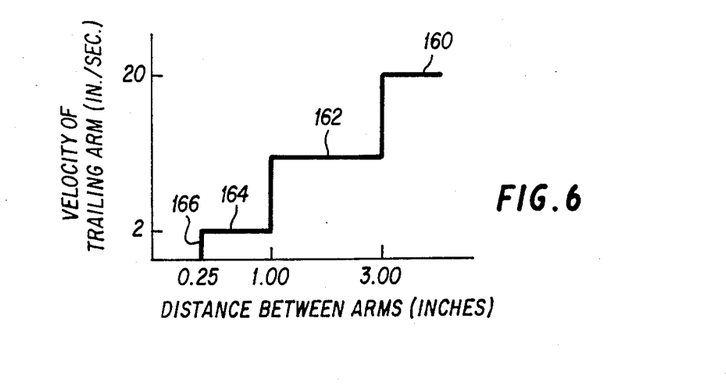
FIG. 6 is a graph showing the relationship between the velocity of the trailing arm and the distance between the arms.

The operation of the system will be understood with reference to FIG. 6 which contains a curve showing the relationship between the velocity of the trailing arm and the distance between the arms. If it is assumed that arm X is trailing arm A, as is shown in FIG. 1, and that the separation between the arms is greater than three inches, then the velocity of the trailing arm X will be at its maximum 160, which in the example shown in the curve of FIG. 6 is twenty inches per second. At that time, there will be no "slow" signals from the position sensors 20 on leads 21 and 22 indicating that the separation between the arm is greater than three inches, and the outputs 52a and 62a will be low. The X-axis drive signal on line 15 from controller 14 is applied to + input 83 of comparator 82. Since arm X is being driven in the direction of arm A, the X-axis drive signal is positive. This is sensed by comparator 82 which produces a high signal on output line 82a. The A-axis drive signal on line 16 is also positive, indicating that leading arm A is moving in the same direction as arm X. When, however, the positive A-axis drive signal is applied to − input 71 of comparator 70, the output 70a will remain low, thus inhibiting AND gates 94 and 98. Although inputs 104 and 108 of AND gates 102 and 106 are high, the signals from comparators 52 and 62 are low and, as a result, outputs 105 and 109 from AND gates 102 and 106 are low as are outputs 97 and 101 from AND gates 94 and 98. The control switches 110, 112, 114 and 116 are therefore all closed. This keeps switch means 117, 118, 117a and 118a actuated maintaining short circuits across speed reducing resistors 128, 138, 148 and 158. The system accordingly is in its full speed mode.

If we now assume that trailing arm X is gaining on leading arm A and that the distance between the arms has become equal to or less than three inches, mask portion 36 of mask member 35 blocks light from lamp 47 from reaching photosensor 41. As a result, photosensor 41 generates a first "slow" signal on lead 21. When this "slow" signal is applied to input 103 of AND gate 102, its output 105 goes high. This causes control switch 114 to open and, in turn, FETs 140 and 144 of switch means 117a become nonconductive removing the short circuit from resistor 148. The system has now switched into a slowdown mode. Resistor 148 is now in series between X-axis drive signal lines 15 and 24 reducing the drive signal applied to servo amplifier 26 and reducing the drive current fed to drive motor 28. This causes the velocity of trailing arm X to drop to its first "slow" speed 162, which in the example shown is about one half the maximum speed.

If arm X continues to gain on arm A until the separation is reduced to one inch or less, mask portion 37 will assume a position in which it blocks the light from lamp 48 from being received by photosensor 42. This causes the photosensor to generate the second "slow" signal on lead 22. The presence of the second "slow" signal is sensed by comparator 62 and output 62a become high. When this high signal is applied to input 107 of AND gate 106, the output 109 goes high and control switch 116 opens causing FETs 150 and 154 to become non-conductive. This removes the short circuit from across speed reducing resistor 158. Resistors 148 and 158 are now in series between X-axis drive signal lines 15 and 24 reducing the magnitude of the drive signal applied to servo amplifier 26, and the magnitude of the drive current supplied by the servo amplifier to drive motor 28. This causes the velocity of trailing arm X to be further reduced to a velocity 164 which, in the example, is about two inches per second.

It may sometimes be the case that, notwithstanding two slowdowns, the arms come close to a collision. This may be due to some kind of malfunction which may, for example, cause the arms to be driven in opposite directions toward each other. If the separation between the arms is reduced to a small predetermined distance, such as the quarter inch separation shown in the example of FIG. 6, mask portion 38 will block the light from lamp 49 from reaching photosensor 43. This will cause photosensor 43 to generate a "stop" signal which is applied on line 23 to controller 14. In response, the controller discontinues the X-axis and A-axis drive signals causing drive motors 28 and 29 to stop as shown at 166 in FIG. 6.

Although the operation of the system has been described with reference to the situation in which arm X trails arm A, it will be understood that the operation when arm A trails arm X will be generally similar. Since the arms will, in this case, be driven in the opposite direction, the polarity of the X-axis and A-axis drive signals will be negative. When the negative A-axis drive signal is applied to input 71 of comparator 70, the output 70a will become high. This will enable AND gates 94 and 98. When a "slow" signal is received on lead 21, comparator output 52a becomes high and, as a result, AND gate 94 output 97 goes high. This causes switch 110 to open bringing its output low to deactivate switch means 117, placing speed reducing resistor 128 in series with A-axis drive signal lines 16 and 25. By the same token, a second "slow" signal on line 22 results in a high output on comparator output lead 62a; and AND gate 98 output 101 goes high, in response to which switch 112 opens. Switch means 118 therefore is deactivated to place speed reducing resistor 138 in the series circuit between A-axis drive signal lines 16 and 25. Drive motor 29 is thus slowed to speed 162 when one "slow" signal is present and to speed 164 when both "slow" signals are present. On the other hand, the negative X-axis drive signal on line 15 applied to input 83 of comparator 82 results in a low output on output lead 82a, thus inhibiting AND gates 102 and 106. Again, when a "stop" signal is present the velocity of both motors is brought to zero at 166.

While the invention has been particularly shown and described with reference to a preferred embodiment thereof, it will be understood by those skilled in the art that the foregoing and other changes in form and detail may be made therein without departing from the spirit and scope of the invention.

We claim:

1. A system for preventing a collision between a first object and a second object comprising:
   first drive means for driving said first object along a path;
   second drive means for driving a second object along said path, said second object trailing said first object;
   sensing means for sensing the distance between said first object and said second object, said sensing means generating a "slow" signal when said distance between said first object and said second object is equal to or less than a predetermined distance; and
   control means responsive to said "slow" signal for reducing the speed of said second object to a first slow speed, said control means comprising a controller generating a drive signal for said second drive means and means inserting an impedance between said controller and said second drive means in response to said "slow" signal.

2. A system for preventing a collision between a first object and a second object comprising:
   first drive means for driving said first object along a path;
   second drive means for driving a second object along said path, said second object trailing said first object;
   sensing means for sensing the distance between said first object and said second object, said sensing means generating a "slow" signal when said distance between said first object and said second object is equal to or less than a predetermined distance; and
   control means responsive to said "slow" signal for reducing the speed of said second object to a first slow speed, wherein said control means comprises a controller generating a drive signal for said second drive means, a resistor connected between said controller and said second drive means, and switch means in parallel with said resistor, said drive signal flowing through said switch means when said switch means is closed and through the resistor when said switch means is open, said switch means being responsive to said "slow" signal to be closed when the "slow" signal is absent and to be open when the "slow" signal is present.

3. A system as recited in claim 1, wherein said sensing means generates a second "slow" signal when said distance between said first object and said second object is equal to or less than a second predetermined distance, said second predetermined distance being smaller than said first predetermined distance, and wherein said control means is responsive to said second "slow" signal for reducing the speed of said second object to a second slow speed slower than said first slow speed, said control means further comprising means to insert an additional impedance between said controller and said second drive means in response to said second "slow" signal.

4. A system, for preventing a collision between a first object and a second object comprising:
   first drive means for driving said first object along a path;
   second drive means for driving a second object along said path, said second object trailing said first object;
   sensing means for sensing the distance between said first object and said second object, said sensing means generating a first "slow" signal when said distance between said first object and said second object is equal to or less than a predetermined distance and generating a second "slow" signal when said distance between said first object and said second object is equal to or less than a second predetermined distance, said second predetermined distance being smaller than said first predetermined distance; and
   control means responsive to said first "slow" signal for reducing the speed of said second object to a first slow speed and responsive to said second "slow" signal for reducing the speed of said second object to a second slow speed slower than said first slow speed, wherein said control means comprises a controller generating a drive signal said second drive means, a first resistor and a second resistor connected in series between said controller and said second drive means, first switch means in parallel with said first resistor, second switch means in parallel with said second resistor, said first switch means being responsive to said first "slow" signal to be closed when the first "slow" signal is absent and to be open when the first "slow" signal is present, and said second switch means being responsive to said second "slow" signal to be closed when the second "slow" signal is absent and to be open when the second "slow" signal is present.

5. A system, for preventing a collision between a first object and a second object comprising:
   first drive means for driving said first object along a path;
   second drive means for driving a second object along said path, said second object trailing said first object;
   sensing means for sensing the distance between said first object and said second object, said sensing means generating a first "slow" signal when said distance between said first object and said second object is equal to or less than a predetermined distance, generating a second "slow" signal when said distance between said first object and said second object is equal to or less than a second predetermined distance, said second predetermined distance being smaller than said first predetermined distance, and generating a "stop" signal when said distance between said first object and said second object is equal to or less than a third predetermined distance, said third predetermined distance being smaller than said second predetermined distance; and
   control means responsive to said first "slow" signal for reducing the speed of said second object to a first slow speed, responsive to said second "slow" signal for reducing the speed of said second object to a second slow speed slower than said first slow speed, and responsive to said "stop" signal for stopping said second object.

6. A system for preventing a collision between a first object and a second object comprising:
   a first drive means for driving said first object along a path;

second drive means for driving a second object along said path, said second object trailing said first object;

sensing means for sensing the distance between said first object and said second object, said sensing means generating a "slow" signal when said distance between said first object and said second object is equal to or less than a predetermined distance; and control means responsive to said "slow" signal for reducing the speed of said second object to a first slow speed, wherein said sensing means comprises photosensor means mounted for movement with one of said objects, said photosensor means comprising a photosensor and a lamp directing light to said photosensor, and a mask member mounted for movement with the other of said objects, said mask member having a portion extending from said other of said objects towards said one of said objects substantially parallel to said path and of such length that it affects the transmission of light from said lamp to said photosensor when said distance between said objects is equal to or less than said predetermined distance to generate said "slow" signal.

7. A system as recited in claim 6, wherein said photosensor means comprises a second photosensor and a second lamp directing light to said second photosensor, and wherein said mask member has a second portion extending from said other of said objects substantially parallel to said path and of such length that it affects the transmission of light from said second lamp to said second photosensor when said distance between said objects is equal to or less than a second predetermined distance smaller than said first predetermined distance to generate a second "slow" signal, said control means being responsive to said second "slow" signal for reducing the speed of said second object to a second slow speed slower than said first slow speed.

8. A system as recited in claim 7, wherein said photosensor means comprises a third photosensor and a third lamp directing light to said third photosensor, and wherein said mask member has a third portion extending from said other of said objects substantially parallel to said path and of such length that it affects the transmission of light from said third lamp to said third photosensor when said distance between said objects is equal to or less than a third distance smaller than said second predetermined distance to generate a third signal, said system comprising controller means responsive to said third signal for stopping said second object.

9. A system for preventing a collision between a first object and a second object comprising:

first drive means for driving said first object along a path;

second drive means for driving said second object along said path;

a controller for generating a first drive signal for energizing said first drive means, and a second drive signal for energizing said second drive means, said drive signals having a positive polarity for driving said objects in a first direction and a negative polarity for driving said objects in a second direction along said path;

sensing means for sensing the distance between said first object and second object, said sensing means generating a "slow" signal when said distance between said first object and said second object is equal to or less than a predetermined distance;

control means responsive to said "slow" signal for reducing the speed of one of said objects, said control means comprising logic circuit means for generating a first control signal when said first object is being driven toward said second object and said "slow" signal is present and for generating a second control signal when said second object is being driven toward said first object and said "slow" signal is present, first speed reducing means for said first drive means for reducing the speed of said first object when said first control signal is present, and second speed reducing means for reducing the speed of said second object when said second control signal is present.

10. A system as recited in claim 9, wherein said first speed reducing means comprises a first resistor in series between said controller and said first drive means and first switch means in parallel with said first resistor, said first switch means being responsive to said first control signal to be closed when said first control signal is absent and to be open when said first control signal is present; and wherein said second speed reducing means comprises a second resistor in series between said controller and said second drive means and second switch means in parallel with said second resistor, said second switch means being responsive to said second control signal to be closed when said second control signal is absent and to be open when said second control signal is present.

11. A system as recited in claim 9 wherein said sensing means generates a second "slow" signal when said distance between said first object and said second object is equal to or less than a second predetermined distance, said second predetermined distance being smaller than said first predetermined distance, and wherein said control means is responsive to said second "slow" signal for reducing the speed of said second object to a second slow speed slower than said first slow speed, said logic circuit means generating a third control signal when said first object is being driven toward said second object and said second "slow" signal is present and for generating a fourth control signal when said second object is being driven toward said first object and said second "slow" signal is present, said system further comprising third speed reducing means for said first drive means for reducing the speed of said first object when said third control signal is present and fourth speed reducing means for reducing the speed of said second object when said fourth control signal is present.

12. A system as recited in claim 11, wherein said third speed reducing means comprises a third resistor in series with said first resistor between said controller and said first drive means and switch means in parallel with said third resistor, said third switch means being responsive to said third control signal to be closed when said third control signal is absent and to be open when said third control signal is present, and wherein said second speed reducing means comprises a fourth resistor in series with said second resistor between said controller and said second drive means and fourth switch means in parallel with said fourth resistor, said fourth switch means being responsive to said fourth control signal to be closed when said fourth control signal is absent and to be open when said fourth control signal is present.

13. A system as recited in claim 11, wherein said sensing means generates a "stop" signal when said distance between said first object and said second object is equal to or less than a third predetermined distance, said third predetermined distance being smaller than said second predetermined distance, and wherein said controller is responsive to said "stop" signal for discontinuing said drive signals to stop said first and second drive means.

* * * * *